United States Patent
Lee et al.

(10) Patent No.: US 8,045,783 B2
(45) Date of Patent: Oct. 25, 2011

(54) METHOD FOR MOVING CELL DETECTION FROM TEMPORAL IMAGE SEQUENCE MODEL ESTIMATION

(75) Inventors: Shih-Jong J. Lee, Bellevue, WA (US); Seho Oh, Bellevue, WA (US)

(73) Assignee: DRVision Technologies LLC, Bellevue, WA (US)

( * ) Notice: Subject to any disclaimer, the term of this patent is extended or adjusted under 35 U.S.C. 154(b) by 1053 days.

(21) Appl. No.: 11/595,611

(22) Filed: Nov. 9, 2006

(65) Prior Publication Data

US 2008/0112606 A1    May 15, 2008

(51) Int. Cl.
  *G06K 9/00* (2006.01)
  *G06K 9/34* (2006.01)
  *G06K 9/68* (2006.01)
(52) U.S. Cl. ......... 382/133; 382/173; 382/218; 382/219
(58) Field of Classification Search .................. None
  See application file for complete search history.

(56) References Cited

U.S. PATENT DOCUMENTS

| | | | |
|---|---|---|---|
| 5,721,692 A * | 2/1998 | Nagaya et al. | 345/475 |
| 5,798,787 A * | 8/1998 | Yamaguchi et al. | 348/152 |
| 6,463,175 B1 | 10/2002 | Lee | |
| 6,507,675 B1 | 1/2003 | Lee et al. | |
| 6,985,172 B1 * | 1/2006 | Rigney et al. | 348/149 |
| 7,076,093 B2 | 7/2006 | Lee et al. | |
| 7,085,401 B2 * | 8/2006 | Averbuch et al. | 382/103 |
| 2004/0151342 A1 * | 8/2004 | Venetianer et al. | 382/103 |
| 2007/0195993 A1 * | 8/2007 | Chen et al. | 382/103 |
| 2007/0274402 A1 * | 11/2007 | Ibrahim et al. | 375/240.29 |

OTHER PUBLICATIONS

J. Rittscher, J. Kato, S. Joga, and A. Blake. A probabilistic background model for tracking. ECCV, pp. 336-350, 2000.
D. Magee, 'Tracking multiple vehicles using foreground, background and motion models', in Proc. ECCV Workshop on Statistical Methods in Video Processing, 2002.
Elgammal, Duraiswami, Harwood, Davis, "Background and foreground modeling using nonparametric kernel density estimation for visual surveillance," Proceedings of IEEE, vol. 90, pp. 1151-1163, 2002.
Radke, R.J. Andra, S. Al-Kofahi, O. Roysam, B. "Image change detection algorithms: a systematic survey", Dept. of Electr., Rensselaer Polytech. Inst., Troy, NY, USA, Apr. 19, 2004.
C. Ridder, O. Munkelt, and H. Kirchner. Adaptive background estimation and foreground detection using kalman filtering. In Int. Conf. on Recent Advances in Mechatronics, pages, 1995.

* cited by examiner

*Primary Examiner* — Samir Ahmed
*Assistant Examiner* — Li Liu

(57) ABSTRACT

A computerized robust cell kinetic recognition method for moving cell detection from temporal image sequence receives an image sequence containing a current image. A dynamic spatial-temporal reference generation is performed to generate dynamic reference image output. A reference based object segmentation is performed to generate initial object segmentation output. An object matching and detection refinement is performed to generate kinetic recognition results output. The dynamic spatial-temporal reference generation step performs frame look ahead and the reference images contain a reference intensity image and at least one reference variation image.

8 Claims, 4 Drawing Sheets

METHOD FOR MOVING CELL DETECTION FROM TEMPORAL IMAGE SEQUENCE MODEL ESTIMATION

TECHNICAL FIELD

This invention relates to the detection and segmentation of moving cells from temporal image sequence.

BACKGROUND OF THE INVENTION

Moving cellular or subcellular object detection from temporal image sequence is the basic step for kinetic analysis of live cell time-lapse movies acquiring from video microscopes. It involves the accurate segmentation of moving cells from stationary background as well as the separation of cells when they touch each other.

Recognition of moving objects is one of the most important problems in computer vision. This problem has many applications in diverse disciplines including remote sensing, surveillance, medical diagnosis and treatment, civil infrastructure, and underwater sensing. Commonly used techniques for moving object detection in video images are dynamic models, temporal differencing and optical flow, background subtraction, etc. (J. Rittscher, J. Kato, S. Joga, and A. Blake "A probabilistic background model for tracking". ECCV, pp. 336-350, 2000; D. Magee, 'Tracking multiple vehicles using foreground, background and motion models', in Proc. ECCV Workshop on Statistical Methods in Video Processing, (2002); Elgammal, R. Duraiswami, D. Harwood, and L. S. Davis, "Background and foreground modeling using non-parametric kernel density estimation for visual surveillance," Proceedings of IEEE, vol. 90, pp. 1151-1163, 2002; Image change detection algorithms: a systematic survey Radke, R. J. Andra, S. Al-Kofahi, O. Roysam, B. Dept. of Electr., Rensselaer Polytech. Inst., Troy, N.Y., USA; C. Ridder, O. Munkelt, and H. Kirchner. Adaptive background estimation and foreground detection using kalman filtering. In Int. Conf. on Recent Advances in Mechatronics, pages 193-199, 1995.)

The prior art dynamic modeling method is only suitable for man-made objects or structurally predictable entities such as cars, airplanes or human (with head, arms, body, legs). They are not suitable for natural objects such as cells or other biological entities. The prior art temporal differencing and optical flow methods are very sensitive to noise due to its inherent high pass filtering characteristics and noise tends to be in the high frequency spectrum.

Background subtraction is a commonly used technique for moving object segmentation in static scenes. It attempts to detect moving regions by subtracting the current image pixel-by-pixel from a reference background image that is created by averaging images over time in an initialization period. The pixels where the difference is above a threshold are classified as foreground. The reference background is updated with new images over time to adapt to dynamic scene changes. However, the simple background subtraction or inter-frame differencing schemes are known to perform poorly. This is due to the inherent variations of the background image that cannot be easily compensated by a simple intensity background image.

Although background subtraction techniques could extract most of the relevant pixels of moving regions even when they stop, they are usually sensitive to dynamic changes such as sudden illumination changes. More advanced methods that make use of the temporal statistical characteristics of individual pixels have been developed in the prior art to overcome the shortcomings of basic background subtraction methods. These statistical methods are mainly inspired by the background subtraction methods in terms of keeping and dynamically updating statistics of the pixels that belong to the background image process. Moving objects are identified by comparing each pixel's statistics with that of the background model. This approach reduces false object detection. Yet, it suffers from missed detection of moving objects or regions of moving objects having low contrast with respect to the background intensity.

OBJECTS AND ADVANTAGES

The moving cell detection method of this invention seeks to significantly improve the moving object detection sensitivity and specificity using spatial-temporal regulation. It uses dynamic spatial-temporal reference including not only reference background image but also reference variation images for the moving object detection. It further includes object detection refinement using previous frame object tracking results and the adaptive integration of the previous results. It also includes conflict resolution to resolve cells that are touching or stacking (overlapping) over time.

The objectives of the moving cell detection method of this invention are:
(1) Use dynamic spatial-temporal referencing method to improve the moving object detection sensitivity and specificity;
(2) Perform object detection refinement using object tracking and adaptive integration as well as conflict resolution to resolve cells that are touching or stacking (overlapping) over time.
(3) Use a frame look ahead strategy for reference image creation so we could detect the moving objects from the first frame of the sequence even though no previous frames are available
(4) Use multiple spatial-temporal channels to selectively detect motions of interest.

SUMMARY OF THE INVENTION

A computerized robust cell kinetic recognition method for moving cell detection from temporal image sequence receives an image sequence containing a current image. A dynamic spatial-temporal reference generation is performed to generate dynamic reference image output. A reference based object segmentation is performed to generate initial object segmentation output. An object matching and detection refinement is performed to generate kinetic recognition results output. The dynamic spatial-temporal reference generation step performs frame look ahead and the reference images contain a reference intensity image and at least one reference variation image.

BRIEF DESCRIPTION OF THE DRAWINGS

The preferred embodiment and other aspects of the invention will become apparent from the following detailed description of the invention when read in conjunction with the accompanying drawings, which are provided for the purpose of describing embodiments of the invention and not for limiting same, in which.

DETAILED DESCRIPTION OF THE INVENTION

I. Robust Kinetic Recognition Method Overview

This invention discloses a computerized robust cell kinetic recognition module that can accurately recognize and track a cell of the current frame (t) using both the current frame image and at least one previous frame (t−1), . . . , (t−k) recognition results. A key innovation of this invention is the creation of dynamic spatial-temporal referencing method implemented in a computer. The dynamic spatial-temporal referencing method generates reference images including not only reference background image but also reference variations images for the moving object detection. The moving object detection is then based on the reference subtraction approach. That is, a moving object is detected by subtracting the current frame from the reference images.

The method further includes object detection refinement using object tracking and adaptive integration as well as conflict resolution to resolve cells that are touching or stacking (overlapping) over time. A frame look ahead strategy is used for reference images creation. Therefore, we could detect the moving objects from the first frame of the sequence even though there are no previous frames available. This is accomplished by the subtraction of the first frame and the initial reference images. Wherein the initial reference images for the first frame are generated using many future frames through the frame look-ahead method.

Figure 1:
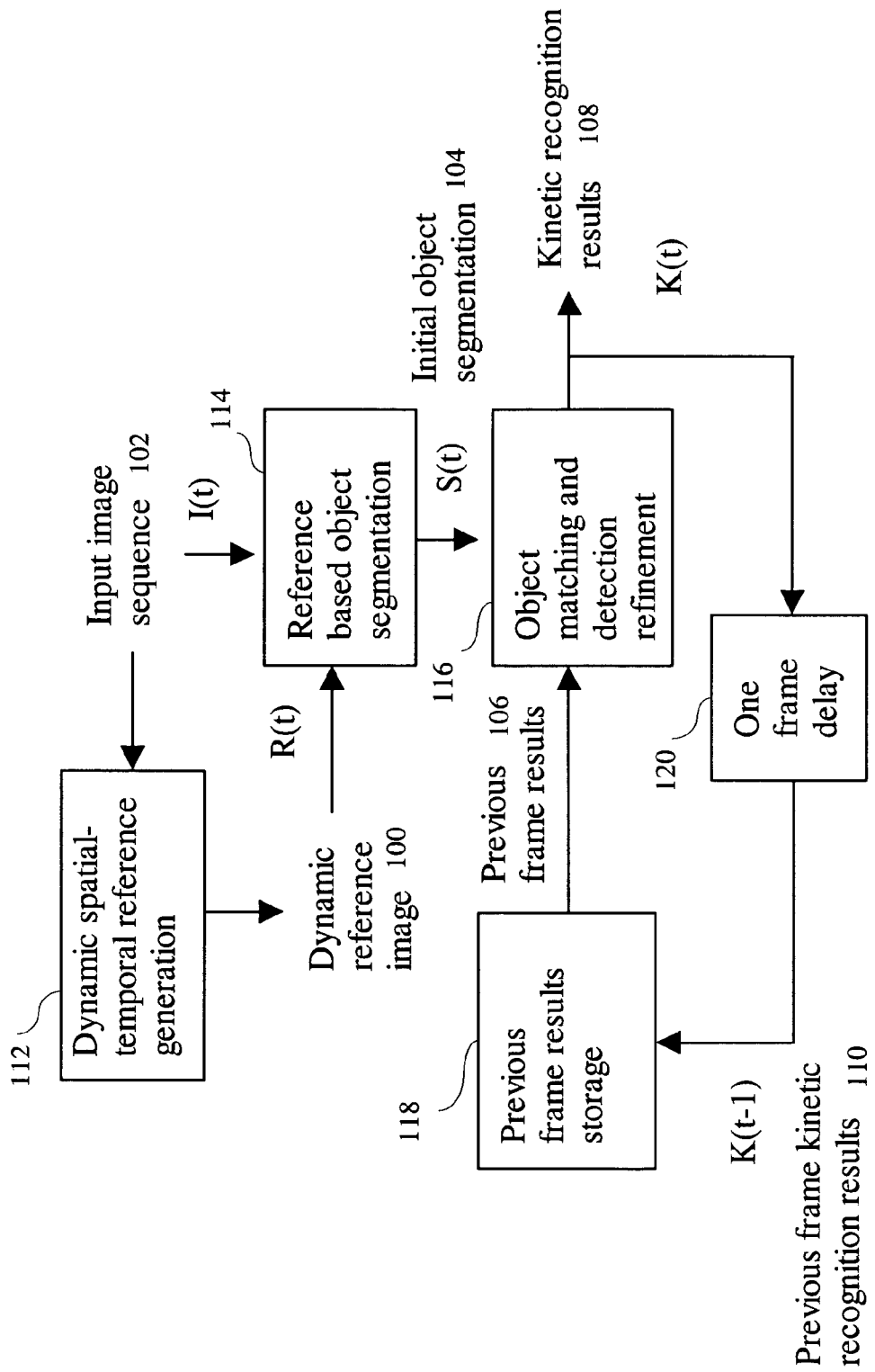
FIG. 1 shows the processing flow for the robust cell kinetic recognition method of the invention.

FIG. 1 shows the processing flow for the robust cell kinetic recognition method. The input image sequence 102 is processed by a dynamic spatial-temporal reference generation 112 module to generate at least one dynamic reference image 100. At time t, the dynamic reference images 100, R(t), are used by a reference based object segmentation 114 module to generate initial object segmentation 104 result at time t, S(t). The result S(t) is refined by an object matching and detection refinement 116 module using the previous frame kinetic recognition results 110 stored in the previous frame results storage 118. The results of the object matching and detection refinement 116 module are the kinetic recognition results 108 for time t, K(t). The kinetic recognition results 108 at current frame t are also stored in the previous frame results storage 118 for use in the next frame t+1. This is illustrated by the one frame delay 120 block in the flow chart.

II. Dynamic Spatial-Temporal Reference Generation

Figure 2:
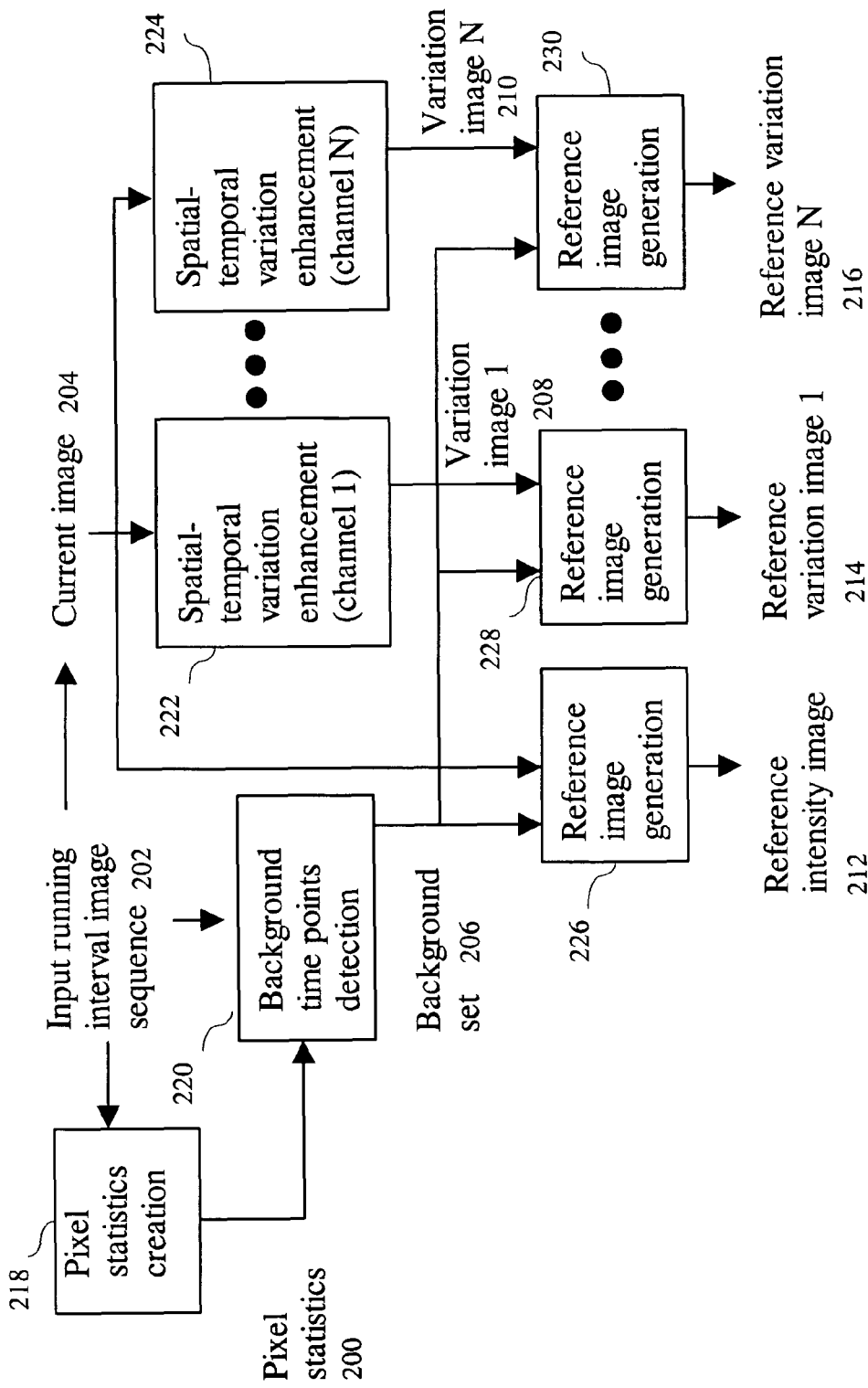
FIG. 2 shows the processing flow for the dynamic spatial-temporal reference generation method.

The detection and segmentation of cells dealing with a largely static background, which is not completely visible all the time due to the presence of the cells blocking the background region. However, live cells move out of their current locations over time and the blocked background becomes visible when the cells move. Therefore, a reference background image could be generated by extracting them from a long enough series of image frames. The reference background can be used for cell detection by the background subtraction methods. Although background subtraction methods could extract the most of the relevant pixels of moving regions even when they stop, they are sensitive to dynamic variations such as sudden illumination changes. More advanced methods that make use of the temporal statistical characteristics of individual pixels can be used to reduce false object detection. Yet, it suffers from missed detection of regions of moving cells having low contrast with respect to the background intensity, which occur very often in label-free imaging protocol such as phase contrast images. Our dynamic spatial-temporal reference generation method generates not only a background intensity reference image but also at least one background spatial-temporal variation images capturing the expected background image variation at specific spatial and temporal resolution. The processing flow for the dynamic spatial-temporal reference generation module is shown in FIG. 2. As shown in the Figure, running intervals of fixed size or flexible size (depending on the level of background variations) from input image sequence are used to create reference images, input running interval image sequence 202. When a running window size is P, the images from frames t−p−1 to t−1 are used to generate reference images for frame t. In the initialization stage, the first p frames use the same interval of initial p images to create reference images. A pixel statistics creation module 218 accumulate pixel statistics 200, one for each pixel. In one preferred but no limiting embodiment of the invention, temporal statistics are extracted including mode and dynamic range for each pixel. The background time points for each pixel within the interval are detected using the pixel statistics 200. In another embodiment of the invention, spatial-temporal statistics are extracted. The mode of each image could be used to constraint the background detection (background should have intensity similar to the mode value of the image since there are more background than cells in most of the applications). The background time points detection 220 module generates background set 206 that is used to generate at least one reference image. The at least reference image is derived from original intensity image resulting in the reference intensity image 212 through a reference image generation 226 step. Additional image or a plurality of images that are enhanced by spatial-temporal filtering (spatial temporal variation enhancement 222, 224) such as spatial-temporal band-pass filters to isolate different scale and velocity channels yielding variation images 208, 210 for reference image generation 228, 230. This results in the reference variation images 214, 216. In one embodiment of the invention, the pixel value of a reference image is the medium value of all background time points for the pixel. If background time point does not exist for a pixel the overall medium value of all pixels with valid background time points are used as the default reference value for the pixel.

III. Reference Based Object Segmentation

The reference based object segmentation of the current invention achieves highly sensitive cell detection by subtracting the input image from the dynamic reference images to create a plurality of difference images. Highly specific performance is achieved by integrating the multiple channels of difference images. The processing flow for the reference based object segmentation is shown in FIG. 3.

Figure 3:
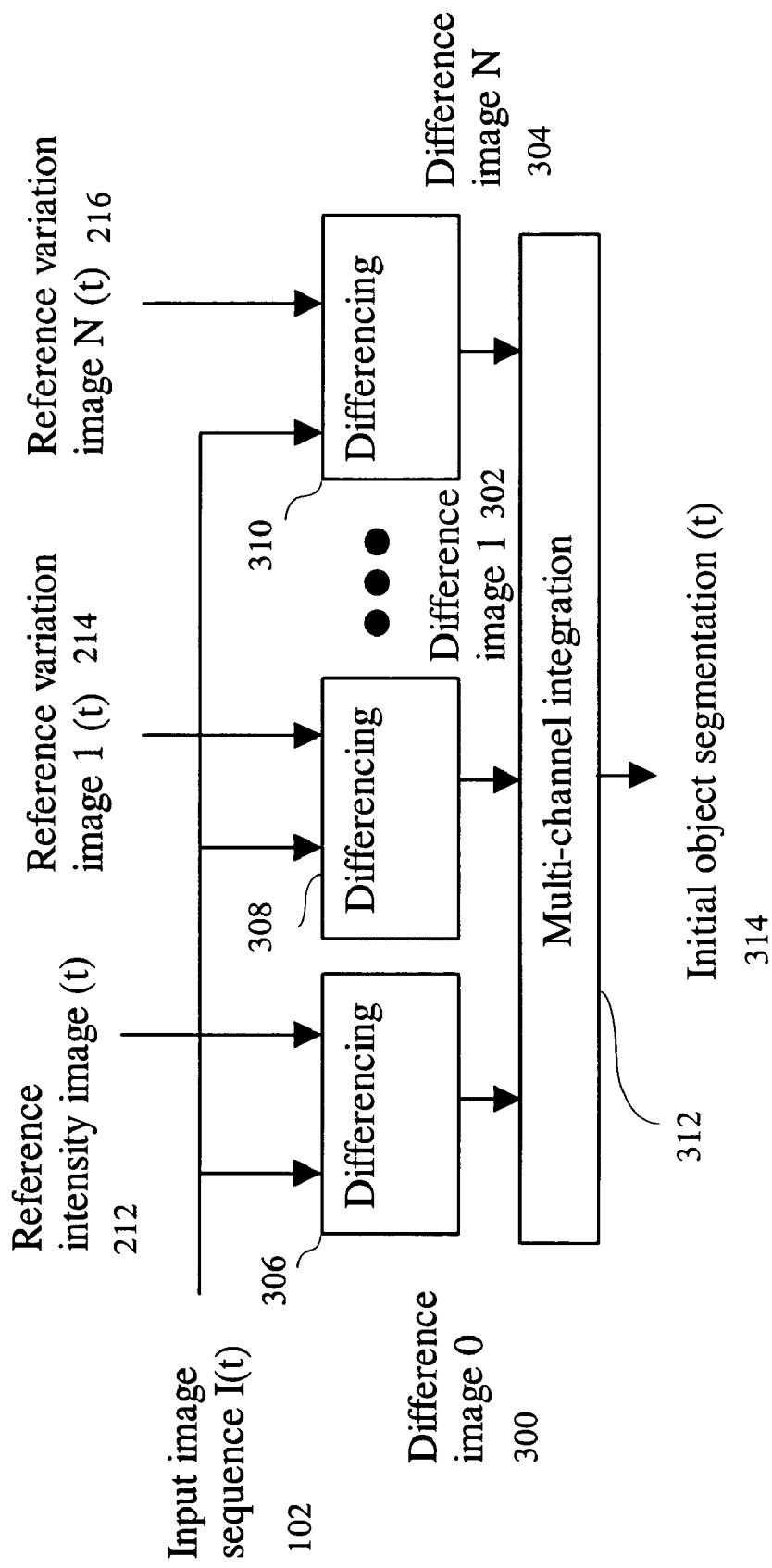
FIG. 3 shows the processing flow for the reference based object segmentation method.

As shown in FIG. 3, the input image sequence 102 at time t, I(t), is processed by performing differencing 306, 308, 310 with multiple reference images 212, 214, 216. This results in multiple difference images 300, 302, 304 for different spatial-temporal channels. In one embodiment of the invention, the differencing 306, 308, 310 is performed by an absolute difference operation. The difference images 300, 302, 304 are integrated by multi-channel integration 312. The multi-channel integration 312 module includes adjustment for different sensitivity and specificity operating points. A maximum operation followed by a thresholding yields the highest sensitivity and lowest specificity. A minimum operation followed by a thresholding yields the lowest sensitivity and highest specificity. Those skilled in the art should recognize that other methods of differencing such as signed subtraction, one side clip subtraction, run-off subtraction, etc. could be used. Also, the multi-channel integration 312 could be accomplished by simple summation and thresholding or by weighted combination and thresholding. Furthermore, thresholding could be applied to each difference image first to generate binary masks and then the integration is performed by selective union or intersection of the binary masks. These different aspects of the embodiments are all within the scope of the current invention.

IV. Object Matching and Detection Refinement

Figure 4:
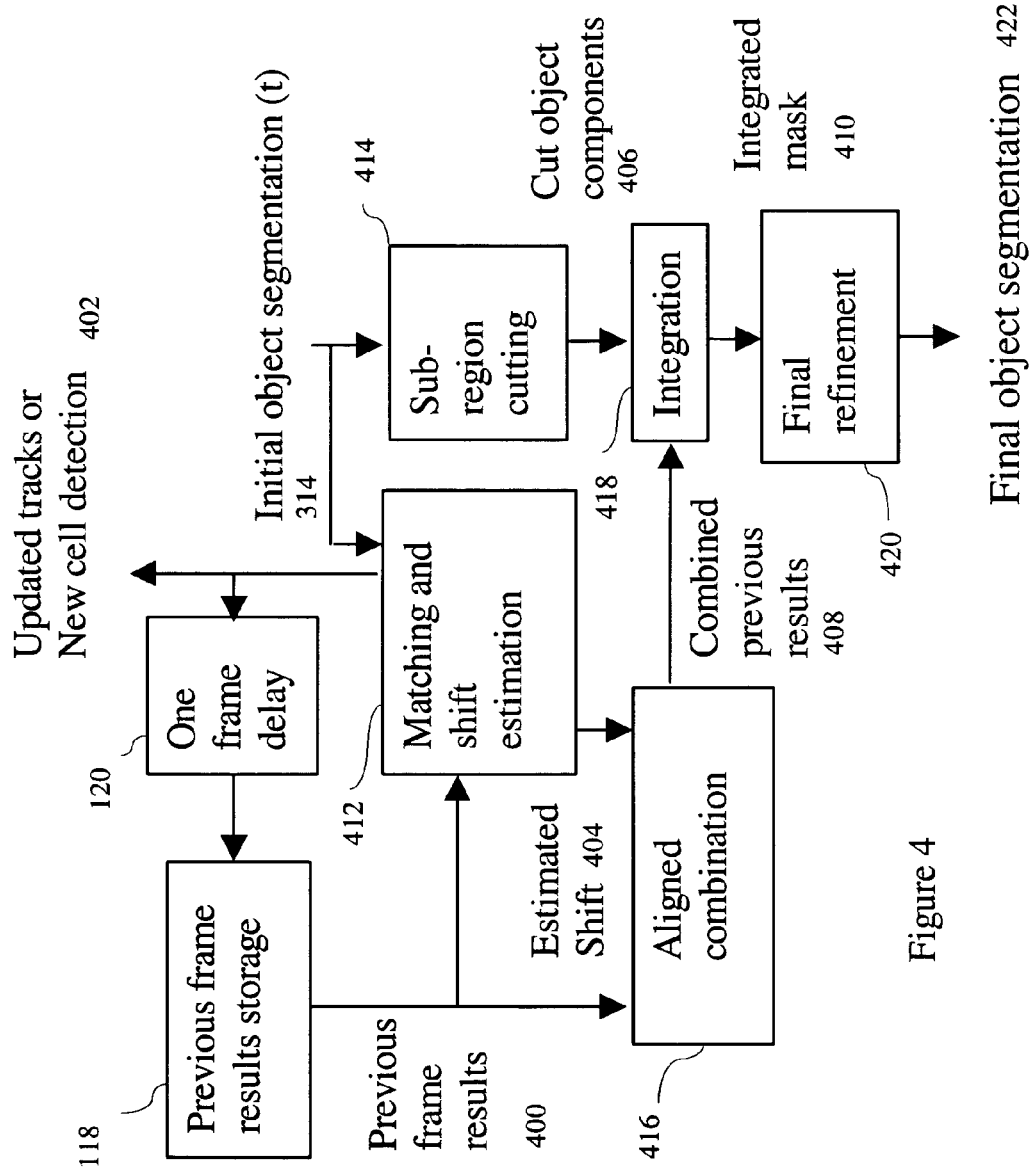
FIG. 4 shows the processing flow for the object matching and detection refinement method.

The initial object segmentation result does not take advantage of the cell tracking results. Therefore, it cannot resolve overlapping cells or cannot group together portion of a cell that is disjointed from the cell body either due to the imaging condition (such as partially out of focus) or physical conditions. The object matching and detection refinement stage uses the results from the previous frames to refine the initial object segmentation results. The processing flow for the object matching and detection refinement method of the invention is shown in FIG. 4. The initial object segmentation 314 is used to find the match between objects of the initial object segmentation of the current frame and objects of the previous frame results 400 stored in the previous frame results storage 118 by the matching and shift estimation 412 step. The matching could be performed using at least one of the features such as location, static object morphology, intensity as well as object kinetic measurements such as velocity and/or acceleration. The matching function could be performed by difference function or buy correlation or normalized correlation. This results in a goodness of match that indicates the similarity between the matches.

The matching and shift estimation 412 step also performs new cell detection. If no reasonable match can be found, a new cell is detected. Otherwise, the newly matched object is added to the track of its matched object in the previous frame. In this case, the displacement between the matches is the estimated shift 404. The updated tracks or new cell detection 402 is stored back to the previous frame results storage 118 after one frame delay 120. Also, the goodness of match for the current frame is stored in the updated track.

The previous frame results 400 corresponding to the best match are aligned with the current frame after shifting by the estimated shift 404 amount. The aligned multiple frame results are combined by an aligned combination 416 stage to generate combined previous results 408. The combination can be done by a simple set union operation or by a weighed combination using the weights from the previous frame results 400 of the same track according to their goodness of matches.

To facilitate the integration and refinement, a sub-region cutting 414 is performed on the initial object segmentation 314. In one embodiment of the invention, the sub-region cutting is performed using watershed method on the distance transformed object regions. Another embodiment of the invention uses watershed method on the smoothed grayscale image of the object region. Those skilled in the art should recognize that other methods such as contour based method can be used for sub-region cutting. The sub-region cutting 414 generates cut object components 406. The cut object components 406 are integrated by an integration 418 step with the combined previous results 408 to generate an integrated mask 410.

In one embodiment of the invention, the integration 418 includes a cut object component 406 in the integrated mask 410 if the object component is close to the corresponding masks of the combined previous results 408. The closeness can be determined by touching. In another embodiment of the invention, the closeness is determined by a percentage of the object component 406 overlapping with the combined previous results 408. The integration 418 module includes a conflict resolution step. If a cut object component 406 has intersection with multiple objects in the previous frame. The previous frame object whose combined previous results have the largest intersection with the cut object component will be the matched object for the cut object component 406 to be included.

An integrated mask 410 is subject to final refinement 420 step. This results in the final object segmentation 422. In one embodiment of the invention, structure guided processing (Shih-Jong J. Lee, "Structure-guided image processing and image feature enhancement", U.S. Pat. No. 6,463,175, Oct. 8, 2002; Shih-Jong J. Lee, Seho Oh, Chi-Chou Huang, "Structure-guided automatic learning for image feature enhancement", U.S. Pat. No. 6,507,675, Jan. 14, 2003; Shih-Jong James Lee, Seho Oh, "Structure-guided Image Inspection", U.S. Pat. No. 7,076,093, Jul. 11, 2006) is used for the final refinement 420. The final object segmentation 422 along with the updated tracks or new cell detection 402 data are the kinetic recognition results 108.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A computerized object matching and detection refinement method for moving cell detection from temporal image sequence comprising the steps of:
  a) Inputting an initial object segmentation from a temporal image sequence containing moving cells wherein objects are cells and the object segmentation is created by dynamic spatial-temporal reference method wherein the dynamic spatial-temporal reference generation method comprising the steps of:
    (i) Inputting running interval image sequence;
    (ii) Performing pixel statistics creation using the running interval image sequence to generate pixel statistics output;
    (iii) Performing background time points detection using the running interval image sequence and the pixel statistics to generate background set output;
    (iv) Performing reference image generation using the current image and the background set to generate reference intensity image output,
  b) Inputting previous frame results;
  c) Performing matching and shift estimation using the initial object segmentation and the previous frame results to generate either estimated shift and updated tracks or new cell detection output wherein the initial object segmentation is used to match the previous frame results using at least one of features such as location, static object morphology, intensity as well as object kinetic measurements such as velocity or acceleration;
  d) Performing aligned combination using the previous frame results and either the estimated shift or zero shift for new cell to generate combined previous results output wherein the previous frame results corresponding to best match are aligned with current frame after shifting.

2. The object matching and detection refinement method of claim 1 further comprising the steps of
  a) Performing sub-region cutting using the initial object segmentation to generate cut object components output;

b) Performing integration using the cut object components and the combined previous results to generate integrated mask output.

3. The object matching and detection refinement method of claim 2 further performing final refinement using the integrated mask to generate final object segmentation output.

4. The final refinement method of claim 3 performing structure guided processing.

5. The object matching and detection refinement method of claim 2 wherein the integration step including a conflict resolution step.

6. The object matching and detection refinement method of claim 2 wherein the integration step including using the cut object components that are close to the combined previous results.

7. The matching and shift estimation step of claim 1 further performing new cell detection.

8. The object matching and detection refinement method of claim 1 wherein the aligned combination performing a weighed combination wherein weights are goodness of matches indicating similarity between matches containing in the previous frame results.

* * * * *